United States Patent
Huber et al.

(10) Patent No.: US 6,176,266 B1
(45) Date of Patent: Jan. 23, 2001

(54) HOUSING BLOCK

(75) Inventors: Hubert Huber, Weitnau (DE); Arne Roesch, Campinas (BR); Markus Wolf, Kempten (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/381,379

(22) PCT Filed: Oct. 27, 1998

(86) PCT No.: PCT/DE98/03136

§ 371 Date: Sep. 20, 1999

§ 102(e) Date: Sep. 20, 1999

(87) PCT Pub. No.: WO99/38739

PCT Pub. Date: Aug. 5, 1999

(30) Foreign Application Priority Data

Jan. 29, 1998 (DE) .............................................. 198 03 366

(51) Int. Cl.⁷ .................................................. B21D 28/10
(52) U.S. Cl. .................................. 137/800; 72/67; 72/335
(58) Field of Search ................................... 137/800, 884; 72/67, 335

(56) References Cited

U.S. PATENT DOCUMENTS

| 4,313,248 | * | 2/1982 | Fujikake | 72/67 |
| 6,018,976 | * | 2/2000 | Wolf | 72/327 |

* cited by examiner

*Primary Examiner*—John Fox
(74) *Attorney, Agent, or Firm*—Ronald E. Greigg; Edwin E. Greigg

(57) ABSTRACT

A housing block for receiving valves, for example piston pumps and storage chambers for use in hydraulic vehicle brake systems. The invention uses a wobble tool to deform material of the housing block at a beginning of a hole essentially in the longitudinal direction of the hole, so that with the insertion of the wobble tool into the housing block in the vicinity of the beginning of the hole, first opening narrowed in relation to the diameter of the hole is produced. The hole becomes narrower with further continuation of the wobbling process and finally disappears. Then the material, which has produced the increased narrowing of the opening and finally its disappearance, forms a closure. The production of plug bodies in accordance with the prior art and the production of assembly devices are eliminated.

2 Claims, 1 Drawing Sheet

HOUSING BLOCK

PRIOR ART

The invention is based on a housing block for a hydraulic subassembly of a brake system for a motor vehicle.

The reference WO 97/12790 has disclosed a housing block of this generic type for a hydraulic subassembly of a motor vehicle brake system. The housing block has bores for receiving hydraulic valves, pump elements, and accumulator pistons, as well as connecting bores for hydraulic brake lines and hydraulic conduits inside the housing block for connecting the hydraulic valves at least with the connecting bores, wherein the conduits are sealed in relation to the outside. The conduits are produced by boring holes starting from at least one housing block side and by inserting a plug into the beginnings of such holes so that they have plugs. The plug parts are alternatively embodied in the form of balls that can be press-fitted, specially formed stoppers, or cover caps formed out of sheet metal. In order to fix the position of the plug parts, which can be subjected to a high degree of hydraulic stress, the reference proposes forming caulking beads out of the material of the housing block that are directed toward the plug parts. The caulking beads can thereby additionally be used as sealing elements.

ADVANTAGES OF THE INVENTION

The housing block, which can be used in a hydraulic vehicle brake system, has the advantage that the cost for producing, inserting, and if need be press-fitting plug parts such as balls, stoppers, covers, or the like is eliminated. Consequently, the previously required storage, as well as the expenditure for separation, transportation, and assembly devices are eliminated.

The disclosure sets forth an inexpensive process for producing the housing block wherein depending on the process, in comparison to the compressive force expenditure for an extrusion die, lesser forces already suffice for the penetration of the wobble tool into the housing block and the resultant production of the closure.

BRIEF DESCRIPTION OF THE DRAWING

The drawing shows a detail from a housing block with a closure according to the invention in a longitudinal section. FIGS. 1 to 4 show partial cross sectional views of a detail from the housing block in which FIGS. 2, 3, and 4 show different production steps of the closure affiliated with the invention.

DESCRIPTION OF THE EXEMPLARY EMBODIMENT

Figure 1:
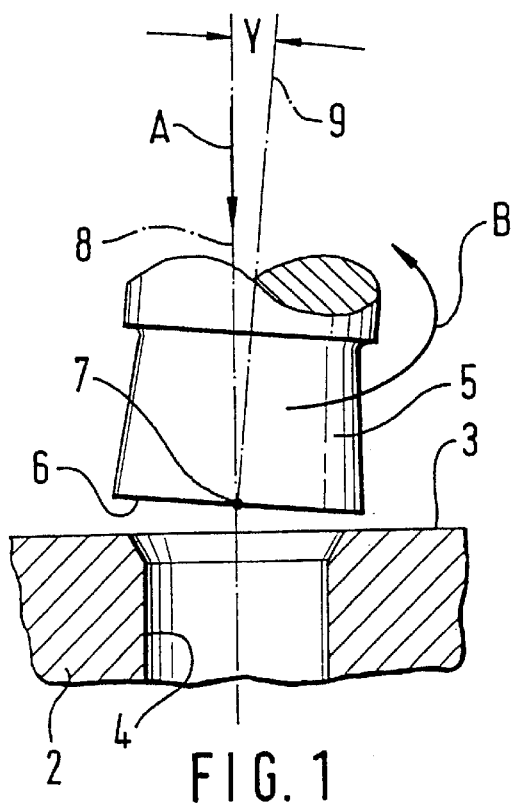

FIG. 1 shows a detail from a housing block 2 in a longitudinal section. The housing block 2 has a housing block side 3, from which a bored hole 4 leads, which is aligned for example at right angles to the side 3.

According to the selected process, a wobble tool 5 is provided for manufacturing the housing block 2. This tool has an end face 6 directed toward the housing block side 3. In the current exemplary embodiment, the end face 6 is embodied as flat-surfaced, circular, and has a center 7. A wobble device, not shown, which can be purchased on the machine tool market, receives the wobble tool 5 and moves the wobble tool on a supply path A toward the housing block 2. In the exemplary embodiment, the movement path A coincides with a longitudinal axis 8 of the bored hole 4. A longitudinal axis 9 of the wobble tool 5 is inclined in relation to the movement path A by an angle Y. For example, the magnitude of the angle Y corresponds to the kind of angle that is provided as fixed or adjustable in a conventional wobble device. As the name already suggests, the wobble device is designed to force the wobble tool 5 into a wobbling movement, which is determined by the above-mentioned angle Y and furthermore by the curved arrow B, which indicates an orbit. In accordance with the principle, therefore, in the example here, all of the zones of the wobble tool 5 outside the center 7 move in wobbling paths. The indicated longitudinal axis 9 of the wobble tool 5 thereby describes the exterior of an acute-angled cone starting from the center 7.

Figure 2:
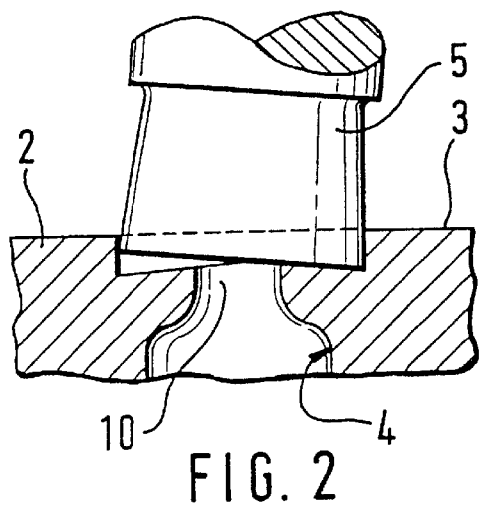

The wobble device itself, which is not shown, or a press, not shown, onto which the wobble device is built, moves the wobble tool 5 in the wobbling state along the movement path A into the housing block 2, which is shown in FIG. 2. As a result, starting from the housing block side 3, material of the housing block 2 is continuously displaced in front of the wobble tool 5. The housing block 2 is made of a ductile material so that this displacement procedure occurs as a flowing process. For example, the ductile material is an aluminum wrought alloy. As can be seen in FIG. 2, such a flowing process produces a displacement of housing block material along the longitudinal axis 8 of the bored hole as well as radially inward. Between the bored hole 4 and thus adjacent to the end face 6 of the wobble tool 5, this produces an opening 10 that is narrowed in relation to the diameter of the bored hole 4. The deeper the wobbling tool 5 is wobbled into the housing block 2, the narrower the opening 10 becomes.

Figure 3:
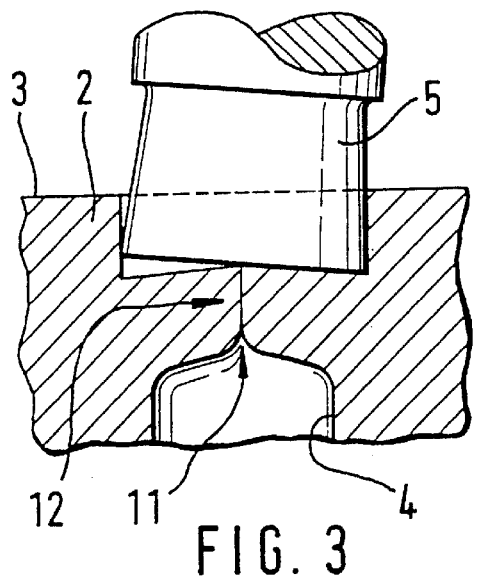
Figure 4:
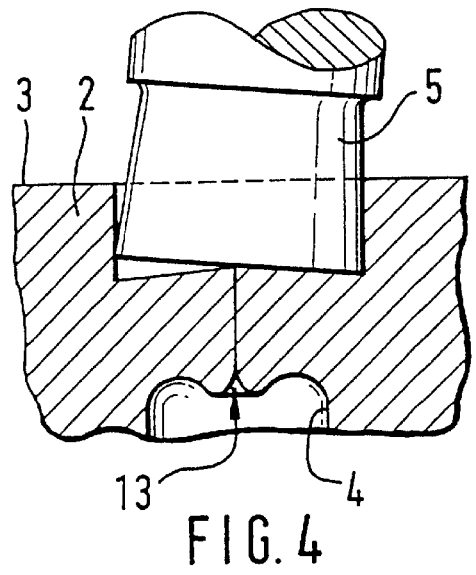

Finally the opening is closed by means of further movement on the movement path A because housing block material comes into radial contact with itself essentially along the longitudinal axis A of the bored hole 4, which is shown in FIG. 3. Instead of the opening 10 according to FIG. 2, the contact line 11 of the housing block material is depicted there. In the vicinity of this contact line 11, the housing block material forms a closure 12 that is desired according to the invention. This closure 12 seals the bored hole 4 in relation to the housing block side 3 and therefore in relation to the environment. As a result the bored hole 4 can be used as a hydraulic conduit that is sealed in relation to the outside.

As can be seen, among other things, from the reference WO 97/12790, the bored hole 4 or the hydraulic conduit can connect the piston pump with an electromagnetically controllable valve or with its stepped installation bore. Through this stepped bore, however, this conduit can also connect the piston pump to a connecting bore, which is provided to connect a brake line to the housing block. However, the use of the closure 12 produced according to the invention is not limited to the exemplary embodiment described above. For example, the bored hole 4 could be bored completely through the only partially depicted housing block 2 and, for example, closures 12 could be disposed at both ends of the hole 4 thus bored. It is clear that one skilled in the art who is constructing housing block 2 can dispose that closure 12 according to the invention at the locations he deems necessary. If one begins once again with WO 97/12790, it does not matter then whether the bored hole 4 is embodied for example in the form of a stepped bore, so that not only is a communication among the hydraulic components produced but also a receiving space is produced for hydraulic fluid for the purpose of producing a hydraulic damper chamber.

However, it is not absolutely necessary to bore the hole 4. On the contrary, flow technology can also be used for producing the hole 4, for example by using a piercing mandrel. Particularly when housing block 2 is embodied as a forged part.

In FIG. 3 a transition from the hole 4 to the contact line 11 is essentially shaped like a truncated cone. If, according to FIG. 4, the wobble tool 5 is wobbled deeper into the housing block 2, then more housing material is naturally displaced into the hole 4, which through a continuation of the flow procedure in the vicinity of the contact line 11 and thereby into the hole 4, can produce an opening 13. The production of such an opening 13 is intrinsically superfluous and disadvantageously extends the time that the wobble tool 5 spends in the housing block 2. Based on the difference between the two FIGS. 3 and 4, one skilled in the art can infer that through trials, a determination can be made as to how far the wobble tool 5 must be pressed into the housing block 2 with a particular, selected material. Depending on the type of material, this can be different for one and the same diameter of a hole 4. When determining the penetration depth for the wobble tool 5 required for a sealed closure 12, one skilled in the art can also experiment with a wobble tool whose end face, in contrast to the depictions according to FIGS. 1 to 4, is not embodied as flat, but as uneven.

It should also be emphasized that the closure 12 according to the invention can also be used in those housing blocks that are not components of vehicle brake systems. A housing block of this kind can for example be a component of the hydraulics of a machine tool, an elevator, or another type of delivery device.

The foregoing relates to a preferred exemplary embodiments of the invention, it being understood that other variants and embodiments thereof are possible within the spirit and scope of the invention, the latter being defined by the appended claims.

What is claimed is:

1. A housing block with bores having at least one hydraulic conduit inside the housing block, wherein the hydraulic conduit extends inside a hole, which leads from a housing block side and is associated with a sealed closure in a vicinity of a housing block side, the housing block is comprised of a ductile material and starting from said housing block side, a volume of the material of the housing block is flow-deformed along the hole (4) as well as radially inward in relation to a longitudinal axis (8) of the hole (4) and thereby covers and seals a cross-section of the hole (4).

2. A process for manufacturing a housing block according to claim 1, the flow forming of the ductile material of the housing block (2) is carried out by means of a wobble tool (5) that has an end face (6), which is oriented toward the housing block (2) and, when wobbling, rolls over a surface that extends radially beyond the diameter of the hole (4).

* * * * *